(12) United States Patent
Kuzmin et al.

(10) Patent No.: US 12,268,353 B1
(45) Date of Patent: Apr. 8, 2025

(54) SYSTEM AND METHOD FOR UTILIZING SWIR SENSING IN CLEANING MACHINES

(71) Applicant: TriEye Ltd., Tel Aviv (IL)

(72) Inventors: Dan Kuzmin, Tel Aviv (IL); Avraham Bakal, Tel Aviv (IL); Uriel Levy, Tel Aviv (IL); Omer Kapach, Tel Aviv (IL)

(73) Assignee: TriEye Ltd., Tel Aviv (IL)

( * ) Notice: Subject to any disclaimer, the term of this patent is extended or adjusted under 35 U.S.C. 154(b) by 0 days.

(21) Appl. No.: 18/856,608

(22) PCT Filed: May 8, 2023

(86) PCT No.: PCT/IB2023/054766
§ 371 (c)(1),
(2) Date: Oct. 12, 2024

(87) PCT Pub. No.: WO2023/227982
PCT Pub. Date: Nov. 30, 2023

Related U.S. Application Data

(60) Provisional application No. 63/345,594, filed on May 25, 2022.

(51) Int. Cl.
*G01N 21/359* (2014.01)
*A47L 9/28* (2006.01)
*A47L 9/30* (2006.01)
*G01N 21/3554* (2014.01)

(52) U.S. Cl.
CPC ............... *A47L 9/2826* (2013.01); *A47L 9/30* (2013.01); *G01N 21/3554* (2013.01); *G01N 21/359* (2013.01); *A47L 2201/06* (2013.01)

(58) Field of Classification Search
CPC ...... A47L 9/2826; A47L 9/30; A47L 2201/06; G01N 21/3554; G01N 21/359
See application file for complete search history.

(56) References Cited

U.S. PATENT DOCUMENTS

2017/0292917 A1  10/2017  O'Dell et al.
2020/0069134 A1  3/2020  Ebrahimi Afrouzi et al.

FOREIGN PATENT DOCUMENTS

WO    WO-2022189709 A1 *  9/2022

OTHER PUBLICATIONS

International Search Report in related PCT application PCT/IB2023/054766, dated Aug. 11, 2023.
Written Opinion in related PCT application PCT/IB2023/054766, dated Aug. 11, 2023.

* cited by examiner

*Primary Examiner* — David P Porta
*Assistant Examiner* — Fani Polyzos Boosalis
(74) *Attorney, Agent, or Firm* — Nathan & Associates Patent Agents Ltd.; Menachem Nathan (57) ABSTRACT

A system and method for utilizing SWIR sensing in automated cleaning machines including a first illumination source for emitting radiation at a first wavelength in the SWIR towards a FOV, a receiver operating in the SWIR to acquire SWIR image data based on radiation reflected from elements located in the FOV and determining, based on the SWIR image data, presence of water-based liquids in the FOV.

18 Claims, 5 Drawing Sheets

SYSTEM AND METHOD FOR UTILIZING SWIR SENSING IN CLEANING MACHINES

CROSS REFERENCE TO RELATED APPLICATIONS

This is a 371 application from international patent application PCT/IB2023/054766 filed May 8, 2023, and is related to and claims priority from U.S. provisional patent application No. 63/345,594 filed May 25, 2022, which is incorporated herein by reference in its entirety

FIELD

The present disclosure relates generally to cleaning machines. More specifically, the present disclosure relates to automated cleaning machines having short range infra-red (SWIR) sensing capabilities.

BACKGROUND

Autonomous or semi-autonomous cleaning machines, such as robotic devices are commonly used in domestic, public, and industrial environments. Such autonomous or semi-autonomous devices may include vacuum cleaners, lawn mowers, robotic mops, floor washers, window washers and other devices.

Recently there has been a rapid advancement in the field of autonomous or robotic cleaning machines, especially vacuum cleaners and floor cleaning machines, the primary objective of which is to navigate a user's home autonomously while cleaning floors and/or carpets. To operate autonomously or with minimal external control while navigating the area, the autonomous devices may commonly utilize mapping, localization, object recognition, and path planning methods. Some of the methods utilized may include vision systems that can capture still or moving images of the surrounding area. However, such systems may suffer from low-light conditions and poor quality of the images captured and may have significant problems in identifying specific obstacles or conditions such as splashes of liquids on the floor. There is a need for improved methods and systems to overcome drawbacks of common automated cleaning machines which use conventional vision systems operated in the visible spectrum.

SUMMARY

Some embodiments may include an automated cleaning system and a method for utilizing SWIR sensing in automated cleaning. The system may include a first illumination source for emitting radiation at a first wavelength in the SWIR towards a field of view (FOV), a receiver operating in the SWIR to acquire SWIR image data based on radiation reflected from elements located in the FOV and determining, based on the SWIR image data, presence of water-based liquids in the FOV.

Some embodiments may include a second illumination source for emitting radiation at a second wavelength in the SWIR towards a target within the FOV and determining a spectral characteristic of the target based on absorption of the target at the first wavelength and absorption of the target at the second wavelength.

According to some embodiments of the disclosure, the second illumination source may emit radiation towards the target by emitting radiation at the second wavelength in the SWIR towards a second FOV included in the first FOV.

According to some embodiments of the disclosure, the second illumination source may include a low power illumination source.

According to some embodiments of the disclosure, the receiver may include one or more germanium (Ge) photodiodes (PDs)

According to some embodiments of the disclosure, the first illumination source may include a laser source.

According to some embodiments of the disclosure, the first wavelength may be between 1300-1400 nm.

According to some embodiments of the disclosure, the second illumination source may include a light emitting diode (LED).

According to some embodiments of the disclosure, the second wavelength is between 800-1000 nm.

Some embodiments may include a third illumination source for emitting radiation at a third wavelength in the SWIR towards the target within the FOV and determining a spectral characteristic of the target based on absorption of the target at the first wavelength, absorption of the target at the second wavelength and absorption of the target at the third wavelength.

BRIEF DESCRIPTION OF THE DRAWINGS

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

One skilled in the art will realize that the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are, therefore, intended to be embraced therein.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure. Some features or elements described with respect to one embodiment may be combined with features or elements described with respect to other embodiments. For the sake of clarity, discussion of same or similar features or elements may not be repeated.

Although embodiments disclosed herein are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions which when executed by a processor cause the processor to perform operations and/or processes.

Although embodiments disclosed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Embodiments disclosed herein may overcome drawbacks of common vision systems implemented in automated cleaning machines. Automated or robotic cleaning machines which use cameras or sensors that detect visible light may utilize wavelength of light from 400 to 700 nano-meter (nm). Such cameras or sensors have some drawbacks, as they may fail to detect certain obstacles on the floor or area being cleaned. For example, liquids such as water, cleaning liquids, urine, or any other liquid may not be detected by a visible camera due to the transparency of the liquid. An automated cleaning machine utilizing a SWIR imaging system may easily detect and identify liquids, e.g., liquids which contain water. Detection of water-based liquids may be based on specific characteristics of water, e.g, water absorbs wavelengths in the region of 1450 nm and therefore returns dark area in the captured image. Other advantages of a cleaning machine utilizing a SWIR imaging system may include specific material detection. Material detection may be useful for identifying the material of the area being cleaned, for example, a wood floor, a parquet floor, a marble floor, ceramic tiles floor and the like. Utilizing SWIR imaging system in cleaning devices as described in embodiments of the present disclosure, may improve current systems, and overcome significant drawbacks of known in the art cleaning machines.

Figure 1:
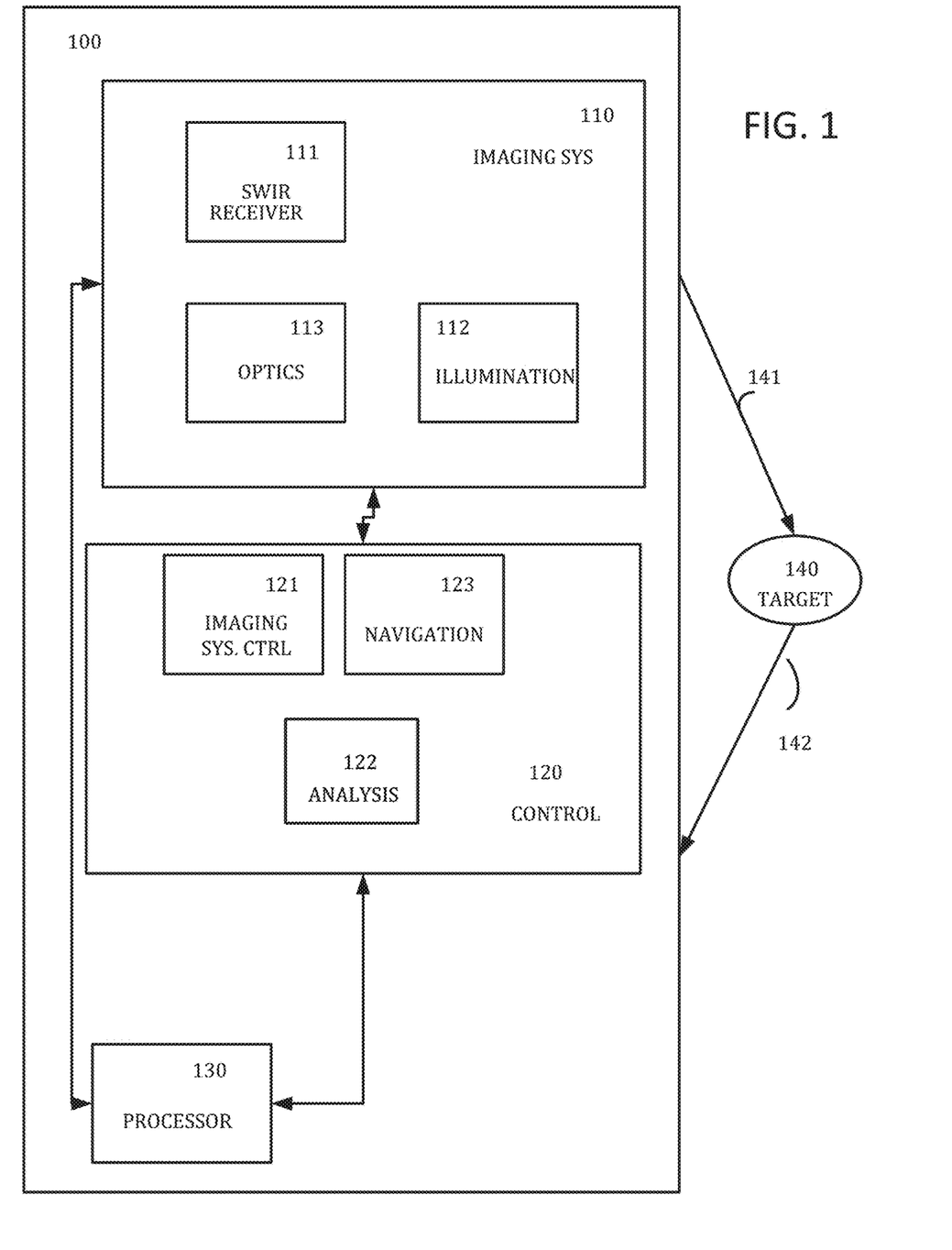
FIG. 1 is a schematic illustration of components of an exemplary non-limiting architecture of an automated cleaning system according to embodiments of the disclosure.

FIG. 1 shows a schematic illustration of components of an exemplary non-limiting architecture of an automated cleaning system according to embodiments of the present disclosure. An automated cleaning system 100 may include a short-wave infrared (SWIR) imaging system 110, a control system 120 and a processor 130. Automated cleaning system 100, also referred to herein as "system 100" may be any automated or semi-automated cleaning machine, for example, a mobile robot, a robotic vacuum cleaner, an automated floor cleaning machine, a ride on floor washer, or any other automated or semi-automated washer, sweeper, scrubber, vacuum cleaner, or any other cleaning machine.

SWIR imaging system 110 may include one or more illumination sources 112, one or more SWIR receiver or sensors 111 and optics 113. Control system 120 may include an imaging system control unit 121, an analysis unit 122 and a navigation unit 123. Processor 130 may be connected to SWIR imaging system 110 and to Control system 120. In some embodiments of the disclosure, processor 130 may be implemented as an internal processor in each of control system 120 and/or imaging system 110 or as an external processor, e.g., external to system 100. SWIR imaging system 110 may be operative to detect light reflected from a FOV, and to provide one or more images of the FOV or part thereof based on light arriving to imaging system 110.

Illumination source 112 may include one or more illumination sources for illuminating or emitting radiation in the SWIR band towards an object, area, or scene, all herein referred to as a target 140. The term "target" refers to any object, area, subject, element, surface, content and/or anything included or located in the FOV of the imaging sensor, such as solids, liquids, flexible, and rigid objects. Outgoing, emitted illumination from system 100 is denoted 141 and the illumination reflected back from target 140 toward system 100 is denoted 142. Portions of the emitted radiation 141 may also be reflected in other directions, deflected, or absorbed by target 140 (not shown).

Illumination source 112 may include any light source or illumination source that may provide a level of illumination to the area surrounding system 100. Any suitable type of illumination source 112 may be used, for example light-emitting diode (LEDs), laser diode, quasi continuous wave (QCW) laser, vertical cavity surface emitting laser (VC-SEL), Q-switched (QS) laser and the like. Any other illumination source or any combination of illumination sources may be included in illumination source 112. Illumination source 112 may emit light in any bandwidth that receiver 111 is able to detect in order to generate an image. For example, light 141 emitted by illumination source 112 may be within the SWIR area of the electromagnetic spectrum.

Illumination source 112 may include a first illumination source for emitting radiation at a first wavelength in the SWIR towards a FOV, e.g., at a wavelength in the range between 1300-1500 nm. For example, emitting radiation or transmitting light at a specific wavelength, e.g., at 1450 nm or in proximity to 1450 nm may allow to detect, observe, identify or monitor presence of water-based liquids within the FOV, as water absorbed radiation at 1450 nm wavelength. SWIR image data may be acquired by receiver 111 based on radiation reflected from target 140. Based on the SWIR image data, presence of water-based liquids in the FOV may be determined by identifying dark areas in the image. For example, dark or black areas in the SWIR image may indicate presence of water, water based liquid and any material which contain water.

According to embodiments of the disclosure, illumination source 112 may be operated in proximity to 1400 nm in the SWIR spectrum, also known as "the solar blind region", where SWIR becomes resilient to ambient noise from the sun. Illumination in proximity to 1400 nm, e.g., between 1300-1500 nm may result in a higher signal to noise ratio (SNR) and an overall improvement of image quality under common low-visibility scenarios such as glare, rain, smoke and fog. This may allow SWIR camera 111 to generate an high resolution image and an increased detection range.

Illumination source 112 may further include a second illumination source for emitting radiation at a second wavelength in the SWIR towards a target within the FOV or towards a second FOV included in the first FOV. The second wavelength is predetermined to be different from the first wavelength (illuminated by the first illumination source) to allow classification or detection of materials of surfaces, planes, objects, obstacles or any other target, area, object pr surface in the FOV according to embodiments of the disclosure. For example, a first illumination source may be a VCSEL emitting light at 1450 nm while a second illumination source may be a LED emitting light at 940 nm. Any additional illumination source, on top of the first illumination source may be required for precise material classification based on spectral analysis.

Receiver 111 may include one or more SWIR sensors or detectors for receiving and collecting radiation reflected from target 140 and/or from the illuminated FOV. Receiver 111 may operate in the SWIR to acquire SWIR image data based on radiation reflected from elements, regions or areas located in the illuminated FOV. Receiver 111 may produce or generate electrical signals in response to electromagnetic radiation detected which are representative of imagery of the illuminated FOV. Receiver 111 may be able to capture images of an area surrounding, neighboring, or in proximity to the location of automated cleaning system 100. For example, receiver 111 may be or may be implemented as a forward-facing camera to capture images in a forward travelling direction of the automated cleaning system 100. In some embodiments, processing of the output of receiver 111 may be performed by processor 130 and additionally or alternatively by an external processor (not shown).

Receiver 111 and/or illumination source 112 may utilize optics 113. Optics 113 may include one or more optical elements, such as mirrors, lenses, diffusors or any other element to improve, enhance and/or support receiver 111 and/or illumination source 112. For example, optics 113 may be arranged to collect, concentrate and optionally filter the reflected radiation 142, and focus the electromagnetic radiation onto a focal plane of receiver 111.

According to some embodiments of the disclosure, receiver 111 may include a plurality of photodetecting devices such as photodetector arrays or "PDAs" which may include a multitude of photosites, each photosite including one or more photodiodes for detecting impinging light and capacitance for storing charge provided by the photodiode. Hereinbelow, "photosite" is often replaced with the acronym "PS". The term "photosite" pertains to a single sensor element of an array of sensors. Each PS may include one or more photodiodes. The PS may also include some circuitry or additional components in addition to the photodiode.

According to some embodiments of the disclosure, receiver 111 may include a plurality of germanium (Ge) photodetectors (PDs) operative to detect the reflected SWIR radiation. In some embodiments, receiver 111 may include a SWIR focal plane array (FPA) while the plurality of Ge PDs may be part of or form a SWIR FPA. Receiver 111 may produce for each of the plurality of Ge PDs an electrical signal that is representative of the amount of impinging SWIR light within its detectable spectral range. The amount of light detected at receiver 111 may include the amount of reflected SWIR radiation from target 140, and may also include additional SWIR light, e.g., arriving from the sun light or from external light sources.

The term "Ge PD" pertains to any PD in which light induced excitation of electrons (later detectable as a photocurrent) occurs within the Ge, within a Ge alloy (e.g., SiGe), or at the interface between Ge (or Ge alloy) and another material (e.g., silicon, SiGe). Specifically, the term "Ge PD" pertains both to pure Ge PDs and to Ge-silicon PDs. When Ge PDs which include both Ge and silicon are used, different concentration of geranium may be used. For example, the relative portion of Ge in the Ge PDs (whether alloyed with silicon or adjacent to it) may range from 5% to 99%. For example, the relative portion of Ge in the Ge PDs may be between 15% and 40%. It is noted that materials other than silicon may also be part of the Ge PD, such as aluminum, nickel, silicide, or any other suitable material. In some implementation of the disclosure, the Ge PDs may be pure Ge PDs (including more than 99.0% Ge).

In some embodiments of the disclosure, receiver 111 may be implemented as a PD array manufactured on a single chip. The PDs, e.g., Ge PDs, may be arranged in any suitable arrangement, such as a rectangular matrix (straight rows and straight columns of Ge PD), honeycomb tiling, and even irregular configurations. Preferably, the number of Ge PDs in receive 111 may allow generation of high-resolution image. For example, the number of PDs may be in the order of scale of 1 Megapixel, 10 Megapixel, or more.

Exemplary embodiments disclosed herein relate to a system and method for high SNR active SWIR imaging using receivers comprising Ge based PDs. The major advantage of Ge receiver technology, as compared to InGaAs technology is the compatibility with CMOS processes, allowing manufacture of the receiver as part of a CMOS production line. For example, Ge PDs can be integrated into CMOS processes by growing Ge epilayers on a silicon (Si) substrate, such as in Si photonics. Ge PDs are also therefore more cost effective than equivalent InGaAs photoreceivers.

Control system 120 may control operation of imaging system 110 by imaging system control unit 121. Imaging system control unit 121 may control operation of receiver 111, illumination source 112 and optics 113. Control unit 121 may trigger activation of illumination source 112 according to a predefined method and as to match the operation of receiver 111. For example, in some embodiments of the disclosure, control unit 121 may trigger illumination source to operate only during the time periods receiver 111 is open for detection of reelected light. In some embodiments of the disclosure, control unit 121 may trigger illumination source 112 to operate constantly, during specific period of time, in pulses or in any other method.

According to some embodiments of the disclosure, control unit 121 may be configured to control activation of receiver 111 for a relatively short integration time, such that to limit the effect of accumulation of dark current noise on the quality of the generated signal. For example, control unit 121 may be operative to control activation of receiver 111 for an integration time during which accumulated dark current noise may not exceed integration-time independent readout noise.

Control system 120 may control and/or perform analysis of imaging data by analysis unit 122. Analysis unit 122 may be connected to imaging system 110 and specifically may receive information from receiver 111. Analysis unit 122 may receive the electrical signals produced in response to electromagnetic radiation detected by receiver 111. The received signals are representative of imagery of the illuminated scene in the FOV. In some embodiments of the disclosure, signals detected by receiver 111 may be processed by analysis unit 122 and/or may be transferred via analysis unit 122 to processor 130 for processing into a SWIR image of target 140 or the illuminated FOV. Analysis unit 122 may further process the electrical signals produced in response to electromagnetic radiation to detect or observe target 140, to perform a spectral analysis of target 140, to determine spectral characteristics of target 140 and/or to determine presence of one or more materials included in target 140.

According to some embodiments of the disclosure, a spectral analysis may be performed based on absorption of target 140 at a first wavelength and absorption of the target at a second wavelength. Target 140 may be illuminated at two different SWIR wavelengths, e.g., a first illumination source may emit radiation at a first wavelength and a second illumination source may emit radiation at a second wavelength, different from the first wavelength. Based on absorption of target 140 at the first wavelength and absorption of target 140 at the second wavelength a spectral analysis of target 140 may be performed and a determination of spectral characteristic of target 140 may be taken or determined.

According to some embodiments of the disclosure, illumination 112 may emit light at a specific wavelength which may be chosen to allow detection, observation or determination of presence of a specific material, e.g., for detection of water, or any liquid which include water. For example, illumination source 112 may emit radiation at a wavelength of 1400 nm or 1450 nm, as water has a prominent absorption peak near the wavelength of 1450 nm.

Control system 120 may further control navigation of cleaning system 100 by navigation unit 123. according to some embodiments of the disclosure, based on the SWIR image of the FOV generated, analysis unit 122 may detect or observe target 140. For example, any obstacle or element detected in the FOV may be identified and may be used to control the navigation of cleaning system 100. Imaging system 110 may include additional types of sensors to provide cleaning system 100 with information about its surrounding environment for navigation purposes. For example, imaging system 110 may include one or more position sensitive devices, one or more physical contact sensors, infra-red (IR) sensors, one or more cameras or sensors that detect visible light or any other type of sensor. Navigation unit 123 may receive signals from any of the sensors of imaging system 110 and may adjust the position and trajectory of cleaning system 100 based on the received signals.

All the information and data gathered by imaging system 110 may fed into control system 120 and specifically into analysis unit 122 and navigation unit 123. Analysis unit 122 may receive the images captured by imaging system 110 and may analyze the images to find significant or landmark features within the FOV, e.g., within the area surrounding the cleaning system 100. Significant or landmark features may include high-contrast features that may be detected within the image, for example spilled water, a leg of a table, a shoe, cables, carpet, or any other object. The landmark features detected may be used by navigation unit 123 to triangulate and determine the position of cleaning system 100 within the local environment and to avoid obstacles without contacting them. For example, by identifying spilled liquids, e.g, a puddle of water, soap water, urine or any other water-based liquid, cleaning system 100 may avoid driving into the liquid, may pass around it and the like.

Figure 2A:
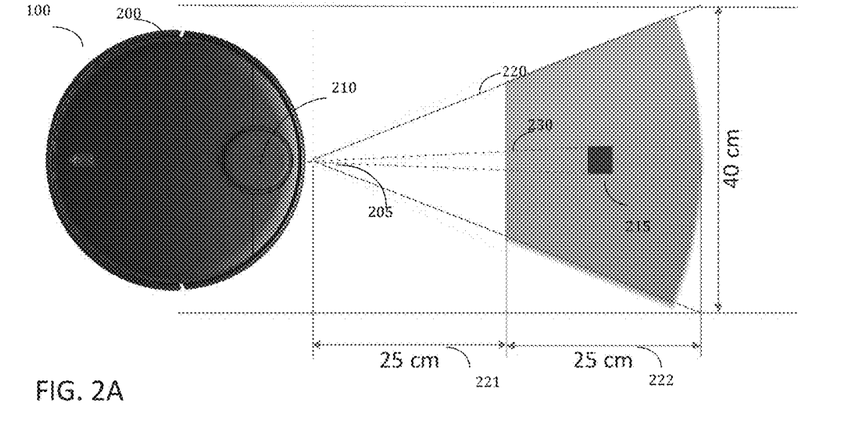
FIGS. 2A, 2B and 2C are schematic views of an exemplary automated cleaning system, according to embodiments of the disclosure.
Figure 2B:
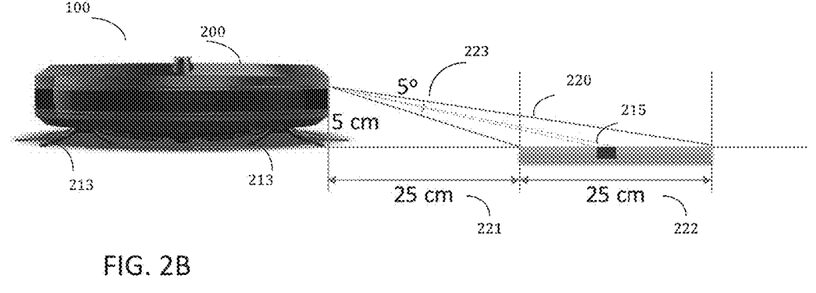
Figure 2C:
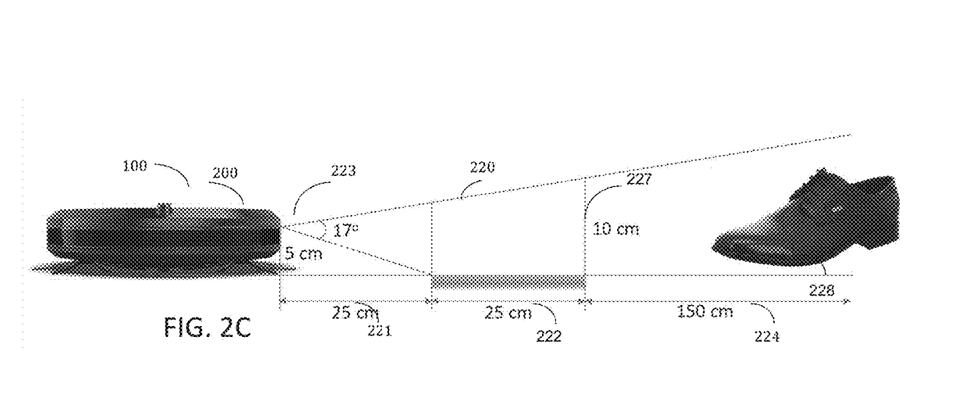

FIGS. 2A, 2B and 2C are schematic views of an exemplary automated cleaning system, according to embodiments of the disclosure. FIG. 2A is a top view of a cleaning system 100 and FIGS. 2B and 2C are side views of cleaning system 100. Cleaning system 100 may be, may include or may utilize cleaning system 100 of FIG. 1. Cleaning system 100 may include main body 200, cleaner heads 213 and other components allowing movement of system 100 such as a motor, transaction unit, power unit, battery, one or more wheels and/or any other element required for movement and cleaning (not shown). It should be understood to a person skilled in the art that the shape and design of main body 200 as well as any other component illustrated in FIGS. 2A-2C serves as an exemplary design and that cleaning system 100 may have any shape, design, structure, or appearance.

According to embodiments of the disclosure, main body 200 may include a camera 210 to capture images of the area surrounding cleaning system 100. Camera 210 may include imaging system 110 of FIG. 1. Camera 210 may be any type of camera that may include SWIR device or receiver 111 of FIG. 1. Control system 120 of FIG. 1 may be embodied within the software and electronics contained within cleaning system 100, which may be able to process the images captured by camera 210 allowing cleaning system 100 to understand, interpret and autonomously navigate the local environment.

The exemplary illustration of FIG. 2A and 2B shows an FOV 220 having a horizontal FOV 205 of 45 degrees and a vertical FOV 223 of 5 degrees. A first illumination source included in cleaning system 100 may illuminate a region that may be located at a minimal distance 221, e.g., 25 centimeters (cm) from cleaning system 100 and at a maximal distance 222, e.g, 50 cm from cleaning system 100. A first illumination source may emit light at wavelength between 1300 to 1500 nm, e.g., at 1450 nm to identify or detect water-based liquids on the surface illuminated by the first illumination source as described in embodiments of the disclosure.

According to embodiments of the disclosure, in order to allow high precision of material classification, at least one additional illumination source may be used to illuminate a second FOV 230 at a second wavelength, different from the first wavelength (used by the first illumination source). Illuminating a second FOV 230 within FOV 220 with a second illumination source at a second wavelength may allow an improved material classification, e.g., of target or area 215 included in the second FOV 230. As each material has a unique spectral response, illumination the detected material, e.g., of target 215, at more than one wavelength may allow identifying, determining or detecting the spectral response of the detected material.

Embodiments disclosed herein may allow using a first main illuminator, e.g., VCSEL for illumination a main FOV 220 and adding one or more additional illumination sources with a limited FOV 230, for each of the additional wavelengths. This may allow to lower the total power required for cleaning system 100 as the additional illumination sources may require low energy to illuminate a limited, partial FOV 230 within main FOV 220. Each of the one or more additional illumination sources may include, for example, an IR LED illuminating at a specific, predetermined selected wavelength.

According to embodiments of the disclosure, the material of target 215, e.g., the floor may be determined based on at least two images of a specific area, target or space which includes the detected material. As every material has a unique spectral response, e.g., a unique spectral reflectance such a unique spectral response may be used to determine the material of the illuminated area. Embodiments disclosed herein may determine a material of a detected target based on at least two images taken at two different wavelengths in the SWIR. For example, a first image may be acquired based on illumination at a first wavelength of a main, larger FOV 220 and a second image may be acquired based on illumination at a second wavelength of a partial FOV 230 included in FOV 220. Other examples may include illuminating the same FOV with two or more wavelengths from two or more illumination sources.

Embodiments disclosed herein may include illuminating the detected material, e.g., FOV 230, at a first wavelength and at a second wavelength and acquiring or identifying two values of reflectivity and/or absorption of the detected material (a first value related to first wavelength and the second value related to the second wavelength). The two values the of reflectivity and/or absorption may match a spectral response of a specific material which may be identified or determined as the detected material.

According to embodiments of the disclosure, two values of reflectivity and/or absorption may be the minimal number of values based on which a spectral response may be determined, however embodiments disclosed herein may allow any number of additional illumination sources emitting radiation at any number of additional wavelengths. For example, a third illumination source for emitting radiation at a third wavelength in the SWIR towards the target within the FOV may be used and a spectral characteristic of the target may be determined based on absorption of the target at the first wavelength, absorption of the target at the second wavelength and absorption of the target at the third wavelength.

Reference is made to FIG. 2C which is a side view of cleaning system 100 according to embodiments of the disclosure. System 100 may give an indication of any obstacles that may be near, or in the area located in proximity to main body 200 of cleaning system 100. This may allow cleaning system 100 to avoid obstacles, e.g., obstacle 228, without contacting them. Based on identifying an obstacle in the image captured by imaging system 110, control 120 of FIG. 1 may generate a control signal and may instruct cleaning system 100 to stop and/or adjust its position and trajectory. This may prevent cleaning system 100 from causing any damage to itself or to the obstacle.

The exemplary illustration of FIG. 2C shows a FOV 220 comprise of a vertical FOV 223 of 17 degrees. A first illumination source may illuminate a region that may be located at a minimal distance 221, e.g., 25 cm from cleaning system 100 and at a maximal distance 224, e.g., 200 cm from cleaning system 100. For example, obstacle 228 which is located within distance 224 at approximately 150 cm from cleaning system 100 and having at least 20% reflectivity difference from the background, may be detected in an image captured by imaging system 110 of cleaning system 100.

For example, in some embodiments of the disclosure, the vertical FOV 223 of 17 degrees may be selected to allow capturing floor or other item at a height 227 of 10 cm in a distance 222 of 50 cm from cleaning system 100. If a single illumination source may be implemented, e.g., in imaging system 110 of FIG. 1, the illumination source may have Gaussian profile to have clear image of height 227 of 10 cm in a distance 222 of 50 cm from cleaning system 100. Adding one or more illumination sources may extend the detection range and the total power respectively.

The images captured by imaging system 110 may be analyzed to find significant or landmark features within the FOV, e.g., obstacle 228 which may have high-contrast features that may be detected within the SWIR image. Detecting obstacle 228 may be used, e.g., by navigation unit 123 of FIG. 1, to determine the position of cleaning system 100 within the local environment and to avoid contacting obstacle 228, e.g., pass around it and the like.

Figure 3:
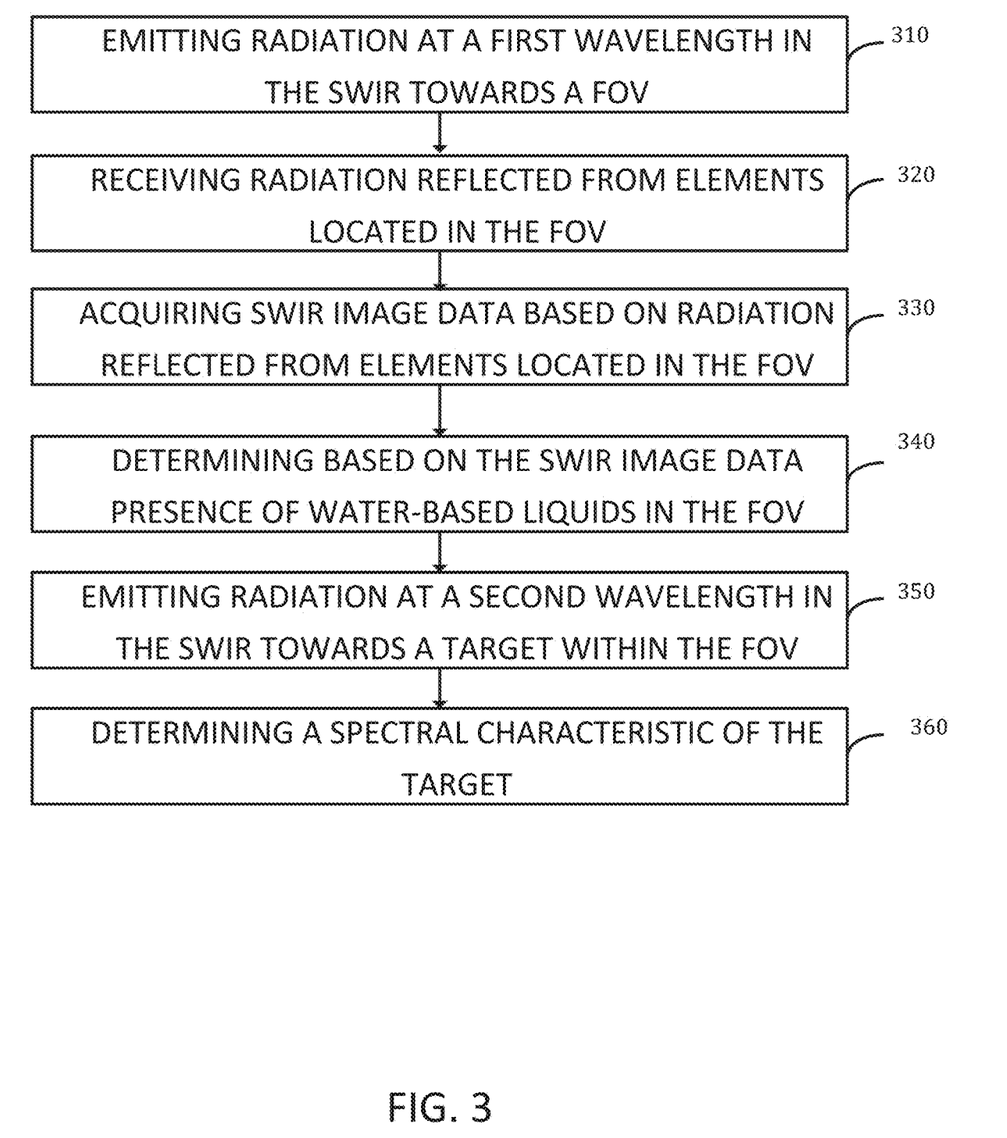
FIG. 3 is a flowchart of a method for using SWIR vision system in an automated cleaning system, according to some embodiments of the disclosure.

Reference is made to FIG. 3, which is a flowchart of a method for using SWIR vision system in an automated cleaning system, according to some embodiments of the disclosure. An embodiment of a method for using SWIR vision system in an automated cleaning system may be performed, for example, by the example system shown in FIG. 1.

In operation 310, a first illumination source may emit radiation at a first wavelength in the SWIR towards a first FOV. For example, the first illumination source, e.g., illumination source 112 of FIG. 1, may emit radiation at a wavelength in the range between 1300-1500 nm. In some embodiments of the disclosure, emitting radiation or transmitting light at a specific wavelength, e.g., at 1450 nm or in proximity to 1450 nm may allow to detect, observe, identify or monitor presence of water-based liquids within the first FOV.

In operation 320, a receiver operating in the SWIR may receive radiation reflected from elements located in the FOV, e.g., from areas, objects, items or any other component located in the FOV. Receiver, e.g., receiver 112 of FIG. 1, may include one or more SWIR sensors or detectors for receiving and collecting radiation reflected from elements located in the FOV. The receiver may produce electrical signals in response to electromagnetic radiation detected which are representative of imagery of the illuminated FOV.

In operation 330, a SWIR image data may be acquired based on radiation reflected from elements located in the FOV. For example, elements located in the FOV may refer to any object, area, subject, surface, content and/or anything included or located in the FOV of the imaging sensor, such as solids, liquids, flexible, and rigid objects.

In operation 340, presence of water-based liquids in the FOV may be determined based on the SWIR image data. For example, as water absorbed radiation at 1450 nm wavelength, a SWIR image data may be acquired based on radiation reflected from the illuminated FOV while presence of water-based liquids in the FOV may be determined by identifying dark areas in the image.

In operation 350, a second illumination source may emit radiation at a second wavelength in the SWIR towards a target within the FOV and/or towards a second FOV included in the first FOV. According to embodiments of the disclosure, the second wavelength is selected such as to be different from the first wavelength to allow detection and spectral classification of materials of surfaces, planes, objects, obstacles or any other target in the FOV.

In operation 360, a spectral characteristic of the target may be determined based on absorption of the target at the first wavelength and absorption of the target at the second wavelength. Based on absorption of target at the first wavelength and absorption of the target at the second wavelength, a spectral analysis of the target may be performed and a determination of spectral characteristic of the target may be taken or determined.

Unless explicitly stated, the method embodiments described herein are not constrained to a particular order or sequence. Furthermore, all operations described herein are intended as examples only and other or different operations may be used. Additionally, some of the described method embodiments or elements thereof may occur or be performed at the same point in time.

In some embodiments, receiver 111 is activated multiple times to create "time slices" each covering a specific distance range. Image processor 130 may combines these slices to create a single image with greater visual depth to allow determining or measuring distances of objects in a FOV.

According to some embodiments of the disclosure, different techniques may be used for determining depth based on outputs of one or more photosites, e.g., photosites included in receiver 111 of FIG. 1. Embodiments disclosed herein may be used for determining distances of objects in a FOV of a SWIR electrooptical system, e.g., imaging system 110 of FIG. 1 as well as other electrooptical systems which are sensitive to other parts of the electromagnetic spectrum.

According to some embodiments of the disclosure, methods for determination of depth may be used, for example, by control system 120 of cleaning system 100 to provide cleaning system 100 with information about its surrounding environment for navigation purposes. For example, navigation unit 123 of FIG. 1 may adjust the position and trajectory of cleaning system 100 based on depth measurements which may indicate the distance of one or more obstacles, landmarks or any other element located in proximity to cleaning system 100.

Embodiments of the intention may generate a depth image of a scene based on detections of SWIR electrooptical imaging system (SEI system). The SEI system described herein may be implemented in any of the systems of cleaning system 100, e.g., imaging system 110, control system 120 or processor 130 of FIG. 1, in accordance with examples of the presently disclosed subject matter. The SEI system may be any of the systems discussed above, or any other suitable SWIR electrooptical system (e.g., a sensor, a camera, a lidar, and so on). Method described herein may be executed by one or more processors of the SEI system, e.g., processor 130 of FIG. 1, and/or one or more processor external to the SEI system, or a combination of both.

A plurality of detection signals of the SEI system may be obtained. Each detection signal may be indicative of amount of light captured by at least one FPA detector of the SEI system from a specific direction within a FOV of the SEI system over a respective detection time frame (i.e., the detection time frame during which the respective detection signal is captured, e.g., measured from the triggering of the illumination by an associated light source such as a laser). The at least one FPA may include a plurality of individual photosites, each photosite may include a Ge element in which impinging photons are converted to detected electric charge. Any type of photosites which characterized by a high dark current, even if not including Ge but rather other elements may be implemented in the SEI system.

For each direction out of a plurality of directions within a FOV, different detection signals (out of the aforementioned plurality of detection signals) are indicative of levels of reflected SWIR illumination from different distances ranges along the direction.

Figure 4:
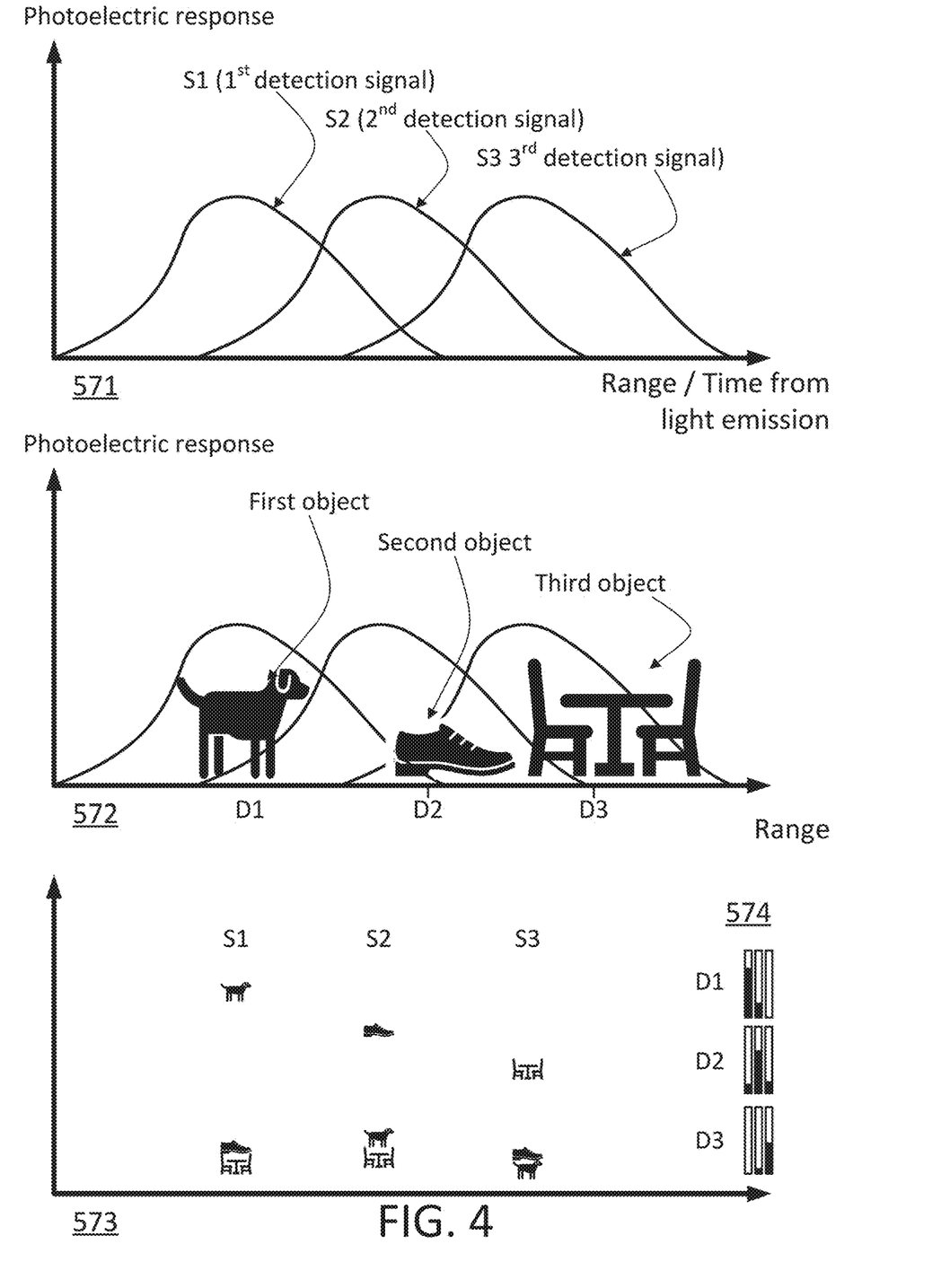
FIG. 4 illustrates the timing of three different detection signals arriving from the same direction within an FOV according to embodiments of the disclosure.

Reference is made to FIG. 4 which illustrates the timing of three different detection signals arriving from the same direction within an FOV according to embodiments of the disclosure. Diagram 571 of FIG. 4, illustrates the timing of three different detection signals arriving from the same direction within the FOV. The y-axis (ordinate) in the diagram is indicative of the level of response of the detection system to reflected photons arriving from the relevant directions. The reflected illumination originates in one or more light sources (e.g., lasers, LEDs) which are optionally controlled by the same processor which controls the FPA, and are reflected from a part of the FOV (e.g., corresponding to the spatial volume detectable by a single photosite). It is noted that different detection signals may be associated with similar but not fully overlapping parts of the FOV (e.g., if the sensor, the scene, or intermediate optics between the two is moving in time, detection signals from the same photosite may be reflected from somewhat different angles within the FOV at different detection time windows associated with the different detection signals.

It is noted that diagram 571 does not show the detection level of each signal, but rather the response of the detection signals to photons reflected from a perfect reflector at different times from the initiation of light emission. Diagram 572 illustrates three objects positioned at different distances from the SEI system, e.g., from cleaning system 100. It is noted that in many instances, in each direction only one object is detected at each time, which is the object nearest to the SEI system. However, in some scenarios more than one object may be detected (e.g., if the foreground object is partly transparent, or not blocking light from the entire photosite).

Diagram 573 illustrates the levels of three returning signals in a direction in which one of the objects is present—in the example, a dog in the near field, a shoe in the middle range, and a table in the far field (the selection of objects is arbitrary, and only light which is reflected from a portion from each object is usually detected by a single photosite). The light returning from an object in distance D1 is represented by the dog figure for the three different detection signals (corresponding to different detection timing windows and to different ranges from the SEI system). Likewise, the levels of detection signals corresponding to light reflected from objects in distances D2 and D3 are represented by a shoe and by a table symbol, correspondingly.

As shown in diagram 574, reflections from an object positioned at a given distance can be translated to a tuple (or any other representation of the data, as any suitable form of direction-associated data-structure (DADS)) which is indicative of the relative levels of detected signals at different time windows. In the illustrated example, each number in the tuple is indicative of the detected signal level in one detection window. The indications of detection levels in the tuple may be corrected for distance from the sensor (as the reflected light from identical objects diminishes with the distance), but this is not necessarily so. While in the illustrated example three partly overlapping time windows where used, any number of time windows may be used. The number of time windows may be the same for different regions of the FOV, but this is not necessarily so.

Embodiments disclosed herein may include processing the plurality of detection signals to determine a three-dimensional (3D) detection map which includes a plurality of 3D locations in the FOV in which objects are detected. The processing may include compensating for dark current (DC) levels accumulated during the collection of the plurality of detection signals resulting from the Ge elements, and the compensating includes applying different degrees of dark current compensation for detection signals detected by different photosites of the at least one focal place array. Referring to the examples of the accompanying drawings, the different detection signals may be obtained at different times by different readout structures of any of the applicable photosites discussed above. Alternatively, the detection signals may be obtained by groups of interconnected photosites, as discussed at a greater detail below. Other implementations may also be used.

In addition to or instead of compensating for accumulated dark current, the processing may include compensating for high integration noise levels and/or readout noise levels during the reading out of the plurality of detection signals. The compensating may include applying different degrees of noise levels compensation for detection signals detected by different photosites of the at least one focal place array.

The compensating for the collection of dark current, for the readout noise, and/or for the integration noise may be done in any suitable way, such as by using any combination of one or more of the following: software, hardware, and firmware. Especially, the compensation for the collection of dark current may be implemented using any combinations of any one or more of the systems, methods, and computer program products discussed above, or any parts thereof. Some non-limiting examples of the systems, methods, and computer program products which may be used for compensating for dark current and for applying degrees of dark current compensation for detection signals detected by different photosites.

In some implementations, the compensating may be executed during the obtaining of the plurality of detection signals (e.g., in the hardware level of the sensor), and the processing may be executed on detection signals which are already compensating for dark current accumulation.

In some embodiments of the disclosure, the compensating may optionally include: subtracting a first dark current compensation offset from a first detection signal detected by a first photosite corresponding to a first detection range and subtracting a second dark current compensation offset, that is different than the first dark current compensation offset, from a second detection signal detected by the first photosite corresponding to a second detection range which is further away from the SEI system than the first detection range.

Embodiments disclosed herein may include coordinating of active illumination (e.g., by at least one light source of the SEI system) and the acquisition of the detection signals. Optionally, embodiments disclosed herein may further include: (a) triggering emission of first illumination (e.g., laser, LED) in coordination with initiating of an exposure of a first gated image in which a plurality of first detection signals are detected for different directions out of the plurality of directions; (b) triggering emission of second illumination (e.g., laser, LED) in coordination with initiating of an exposure of a second gated image in which a plurality of second detection signals are detected for the different directions; and (c) triggering emission of third illumination (e.g., laser, LED) in coordination with initiating of an exposure of a third gated image in which a plurality of third detection signals are detected for the different directions.

In such a case, the processing may optionally include: determining a presence of a first object in a first 3D location within a first direction out of the different directions based on at least one detection signal from each image out of the first image, the second image, and the third image, and determining a presence of a second object in a second 3D location within a second direction out of the different directions based on at least one detection signal from each image out of the first image, the second image, and the third image, wherein a distance of the first object from the SEI system is at least twice a distance of the second object from the SEI system.

Optionally, the applying of the different degrees of DC compensation for detection signals detected by different photosites of the at least one FPA may include using detected dark current levels of different reference photosites which are shielded from light arriving from the FOV.

Optionally, the compensating may include applying different degrees of DC compensation for detection signals detected concurrently by different photosites of the at least one FPA.

Referring to integration noise and to readout noise, it is noted that the compensation for such noises may be correlated by the at least one processor executing embodiments to the number of illumination pulses used for illuminating parts of the FOV during the acquisition of the respective detection signals. The different number of illumination pulses may result in significant non-linearity of the detected signal, which is optionally corrected as part of the processing prior to the determining of the distance/3D location of different objects in the FOV.

Referring to the use of DADS for determining the distance/3D location for different objects in the FOV, it is noted that different translation functions of DADS (e.g., tuples) to distance may be used for different directions within the FOV, e.., in order to compensate for non-uniformity of the detection channel across the FOV (e.g., of the sensor and/or the detection objects), for non-uniformity of illumination (e.g., using multiple light sources, light source non-uniformity or optics non-uniformity), and so on.

According to some embodiments of the disclosure, different detection signals from the same direction within the FOV correspond to different detection windows, which may be of the same distance, or of different distances. For example, a detection window may correspond to a range of distances which is about 50 cm (e.g., between 80 cm from the SEI system and 130 cm from the SEI system). In different examples, some or all of the detection windows used for determining a distance/3D location for an object in the FOV may be of a range of distances which is between 0.0 1m-0.1 m, 0.1 m-10 m, between 5 m-25 m, between 20 m-50 m, between 50 m-100 m, between 100 m-250 m, and so on. The distances ranges associated with different detection signals may overlap. For example, a first detection window may detect returning light from objects whose distances from the SEI system is between 0 cm and 50 cm, a second window may correspond to objects between 25 cm and 75 cm, and a third window may correspond to objects between 50 cm and 150 cm.

Embodiments disclosed herein may include a system for generating a depth image of a scene based on detections of a short-wave infrared (SWIR) electrooptical imaging system (SEI system), the system including at least one processor configured to: obtain a plurality of detection signals of the SEI system each detection signal indicative of amount of light captured by at least one FPA detector of the SEI system from a specific direction within a FOV of the SEI system over a respective detection time frame, the at least one FPA including a plurality of individual photosites, each photosite including a Ge element in which impinging photons are converted to detected electric charge, wherein for each direction out of a plurality of directions within a FOV, different detection signals are indicative of reflected SWIR illumination levels from different distances ranges along the direction; and to process the plurality of detection signals to determine a three-dimensional (3D) detection map including a plurality of 3D locations in the FOV in which objects are detected, wherein the processing includes compensating for dark current (DC) levels accumulated during the collection of the plurality of detection signals resulting from the Ge elements, wherein the compensating includes applying different degrees of DC compensation for detection signals detected by different photosites of the at least one FPA.

In some embodiments of the disclosure, compensating may include: subtracting a first DC compensation offset from a first detection signal detected by a first DE corresponding to a first detection range; and subtracting a second DC compensation offset, that is different than the first DC compensation offset, from a second detection signal detected by the first DE corresponding to a second detection range which is further away from the SEI system than the first detection range.

In some embodiments of the disclosure, at least one processor may be further configured to: (a) trigger emission of first illumination in coordination with initiating of an exposure of a first gated image in which a plurality of first detection signals are detected for different directions out of the plurality of directions; (b) trigger emission of second illumination in coordination with initiating of an exposure of a second gated image in which a plurality of second detection signals are detected for the different directions; and (c) trigger emission of third illumination in coordination with initiating of an exposure of a third gated image in which a plurality of third detection signals are detected for the different directions. In such a case, the at least one processor may be further configured to determine, as part of the determining of the 3D detection map: (a) a presence of a first object in a first 3D location within a first direction out of the different directions based on at least one detection signal from each image out of the first image, the second image, and the third image, and (b) a presence of a second object in a second 3D location within a second direction out of the different directions based on at least one detection signal from each image out of the first image, the second image, and the third image, wherein a distance of the first object from the SEI system is at least twice a distance of the second object from the SEI system. The gated image (or equivalent thereof) may be achieved by utilizing the different readout structures of photosites of a PDA, e.g., in any of the ways discussed above.

In some embodiments of the disclosure, applying of the different degrees of DC compensation for detection signals detected by different photosites of the at least one FPA includes using detected dark current levels of different reference photosites which are shielded from light arriving from the FOV. Optionally, the compensating may include applying different degrees of DC compensation for detection signals detected concurrently by different photosites of the at least one FPA. Optionally, one or more processors (and possibly all) out of the at least one processor may be part of the SEI system.

Figure 5:
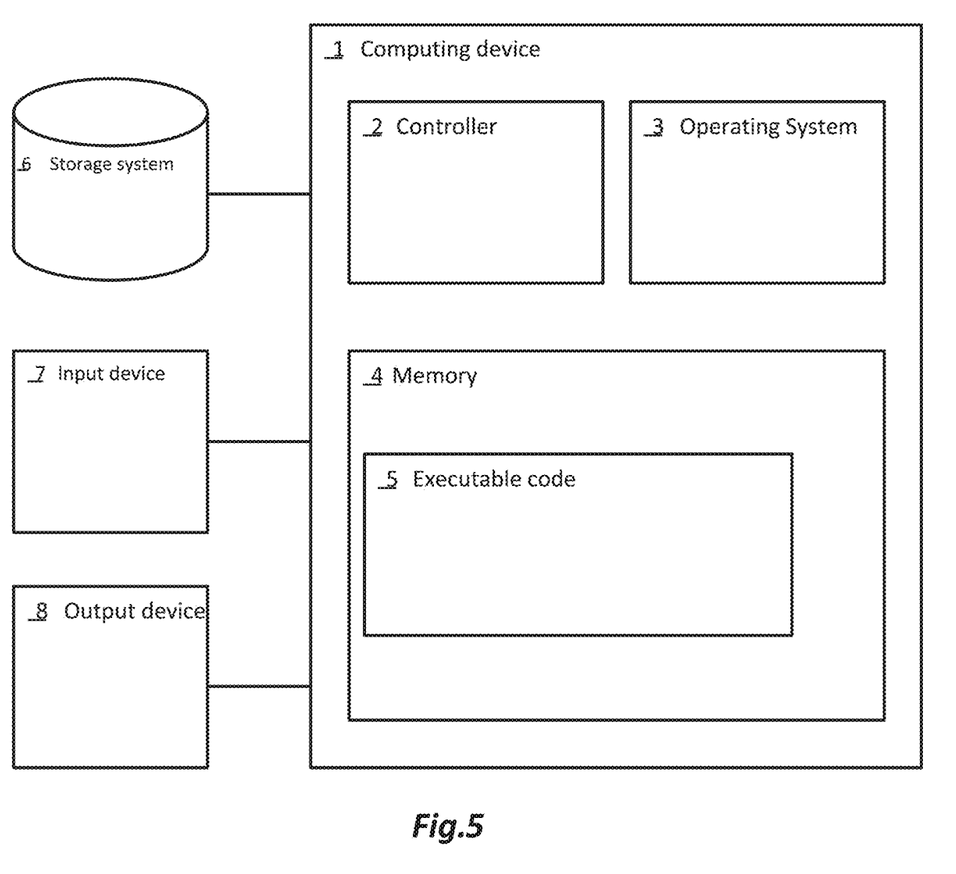
FIG. 5 is a block diagram depicting a computing device, which may be included within an embodiment of a system for utilizing SWIR sensing in cleaning machines, according to some embodiments of the disclosure.

Reference is now made to FIG. 5, which is a block diagram depicting a computing device, which may be included within an embodiment of a system for utilizing SWIR sensing in cleaning machines, according to some embodiments of the disclosure.

Computing device 1 may include a controller 2 that may be, for example, a central processing unit (CPU) processor, a chip or any suitable computing or computing device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the disclosure. For example, computing device 1 may be included in imaging system 1, control system 120 and/or processor 130 of cleaning system 100 of FIG. 1.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may allow automatically acquiring SWIR images. Although, for the sake of clarity, a single item of executable code 5 is shown in FIG. 4, a system according to some embodiments may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 4 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments may include components such as, but not limited to, a plurality of central processing units (CPU) or any other suitable multi-purpose or specific processors, controllers (e.g., controllers similar to controller 2), microprocessors, microcontrollers, field programmable gate arrays (FPGAs), programmable logic devices (PLDs) or application-specific integrated circuits (ASIC). A system according to some embodiments may include a plurality of input units, a plurality of output units, a plurality of memory units, and a plurality of storage units. A system may additionally include other suitable hardware components and/or software components. Where applicable, modules or units described herein, may be similar to, or may include components of, device 1 described herein.

Unless otherwise indicated, the functions described hereinabove may be performed by executable code and instructions stored in computer readable medium and running on one or more processor-based systems. Moreover, those skilled in the art will appreciate that the disclosure may be practiced with other computer system configurations, including multiprocessor systems, microprocessor-based electronics, minicomputers, mainframe computers, and the like.

The terms, "for example", "e.g.", "optionally", as used herein, are intended to be used to introduce non-limiting examples. While certain references are made to certain example system components or algorithms, other components and algorithms can be used as well and/or the example components can be combined into fewer components and/or divided into further components.

While certain features of the disclosure have been illustrated and described herein, many modifications, substitutions, changes, and equivalents may occur to those skilled in the art. It is, therefore, to be understood that the appended claims are intended to cover all such modifications and changes as fall within the true spirit of the disclosure.

Various embodiments have been presented. Each of these embodiments may of course include features from other embodiments presented, and embodiments not specifically described may include various features described herein.

What is claimed is:

1. An automated cleaning system, comprising:
   a first illumination source for emitting radiation at a first wavelength in the short wave infrared range (SWIR) towards a field of view (FOV);
   a receiver operating in the SWIR to acquire SWIR image data based on radiation reflected from elements located in the FOV; and
   a processor for determining, based on the SWIR image data, presence of water-based liquids in the FOV, wherein the receiver comprises one or more germanium (Ge) photodiodes (PDs).

2. The automated cleaning system of claim 1, further comprising:
   a second illumination source for emitting radiation at a second wavelength in the SWIR towards a target within the FOV, wherein the processor is operative to determine a spectral characteristic of the target based on absorption of the target at the first wavelength and absorption of the target at the second wavelength.

3. The automated cleaning system of claim 2, wherein the second illumination source is to emit radiation towards the target by emitting radiation at the second wavelength in the SWIR towards a second FOV included in the first FOV.

4. The automated cleaning system of claim 2, wherein the second illumination source comprises a low power illumination source.

5. The automated cleaning system of claim 2, wherein the second illumination source comprises a light emitting diode (LED).

6. The automated cleaning system of claim 2, wherein the second wavelength is between 800-1000 nm.

7. The automated cleaning system of claim 1, wherein the first illumination source comprises a laser source.

8. The automated cleaning system of claim 1, wherein the first wavelength is between 1300-1400 nm.

9. The automated cleaning system of claims 1, further comprising:
   a third illumination source for emitting radiation at a third wavelength in the SWIR towards the target within the FOV, wherein the processor is further operative to determine a spectral characteristic of the target based on absorption of the target at the first wavelength, absorption of the target at the second wavelength and absorption of the target at the third wavelength.

10. A method for using short wave infrared range (SWIR) vision system in an automated cleaning system, the method comprising:
    emitting, by a first illumination source, radiation at a first wavelength in the SWIR towards a field of view (FOV);
    receiving, by receiver operating in the SWIR, radiation reflected from elements located in the FOV, wherein the receiver comprises one or more germanium (Ge) photodiodes (PDs);
    acquiring SWIR image data based on radiation reflected from elements located in the FOV; and
    determining based on the SWIR image data presence of water-based liquids in the FOV.

11. The method of claim 10, further comprising:
    emitting, by a second illumination source, radiation at a second wavelength in the SWIR towards a target within the FOV; and
    determining a spectral characteristic of the target based on absorption of the target at the first wavelength and absorption of the target at the second wavelength.

12. The method of claim 11, wherein emitting radiation at a second wavelength in the SWIR towards a target within the FOV comprises emitting radiation at the second wavelength in the SWIR towards a second FOV included in the first FOV.

13. The method of claim 11, wherein the second illumination source comprises a low power illumination source.

14. The method of claim 11, wherein the second illumination source comprises a light emitting diode (LED).

15. The method of claim 11, wherein the second wavelength is between 800-1000 nm.

16. The method of claim 10, wherein the first illumination source comprises a laser source.

17. The method of claim 10, wherein the first wavelength is between 1300-1400 nm.

18. The method of claims 10, further comprising:
    emitting radiation at a third wavelength, by a third illumination source, in the SWIR towards the target within the FOV; and
    determining a spectral characteristic of the target based on absorption of the target at the first wavelength, absorption of the target at the second wavelength and absorption of the target at the third wavelength.

* * * * *